Dec. 17, 1968   T. W. F. FOSTER   3,417,166
MELTING FURNACE METHOD
Filed Feb. 21, 1966   2 Sheets-Sheet 1
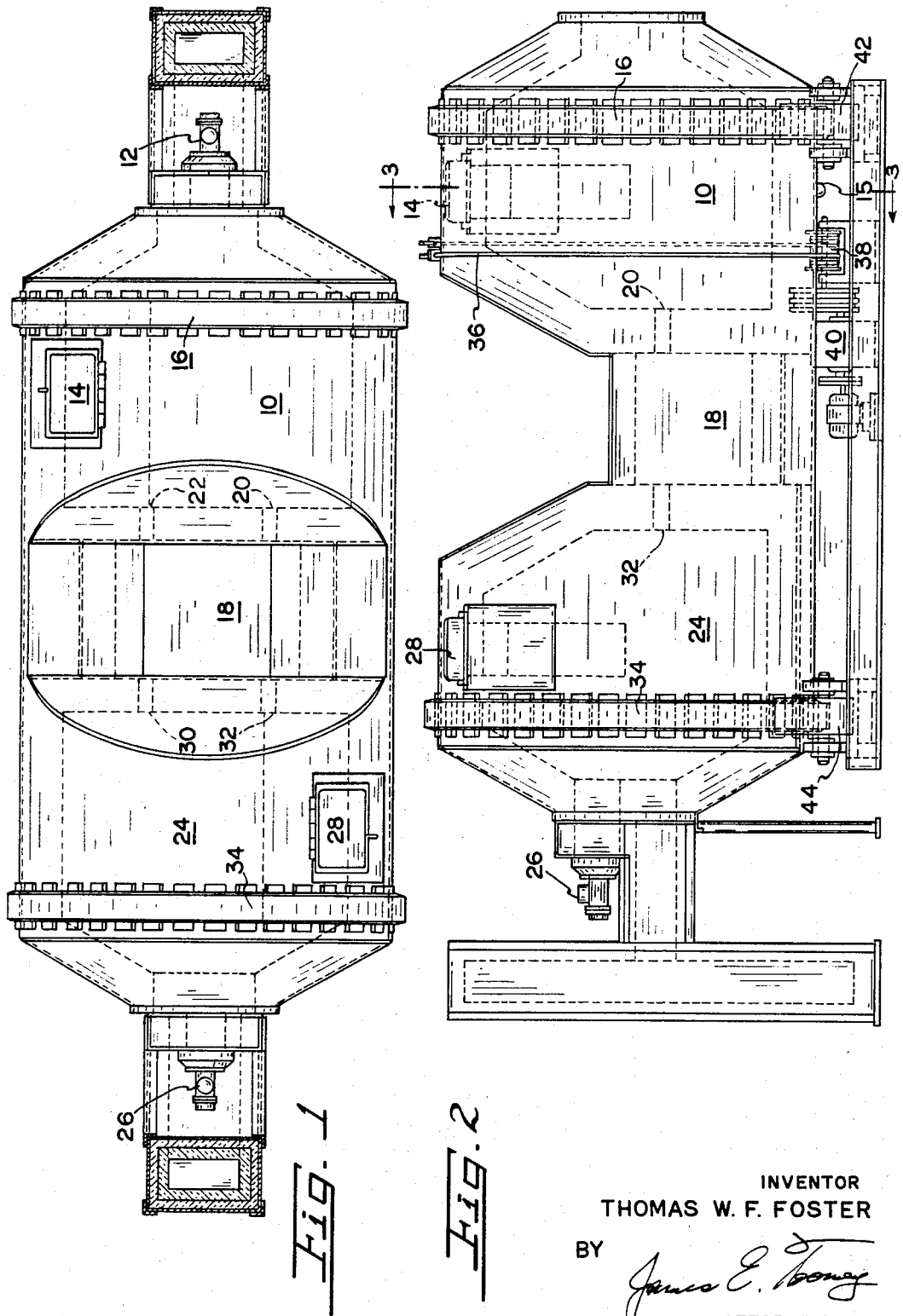
INVENTOR
THOMAS W. F. FOSTER
BY
ATTORNEY Dec. 17, 1968    T. W. F. FOSTER    3,417,166
MELTING FURNACE METHOD
Filed Feb. 21, 1966    2 Sheets-Sheet 2
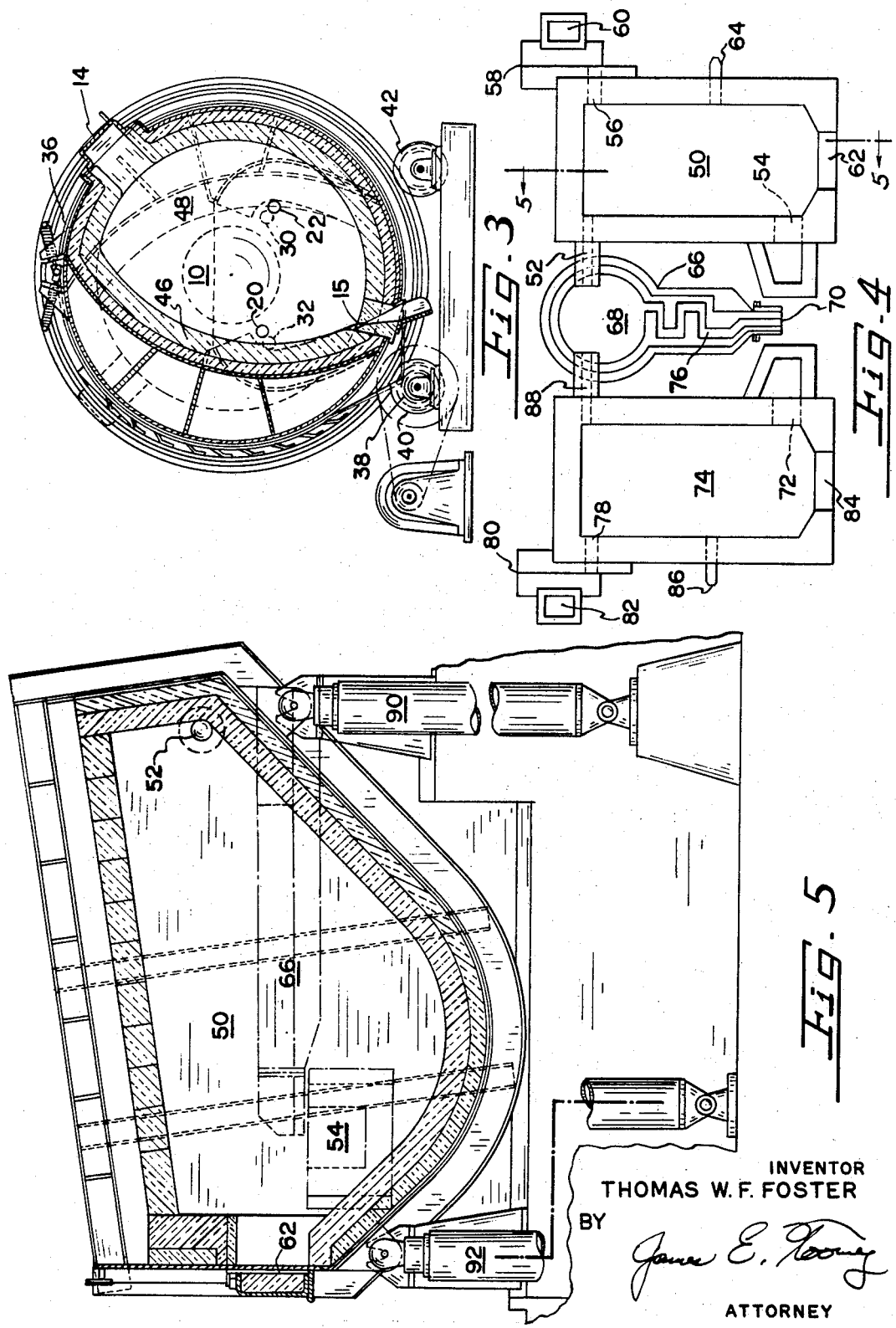
INVENTOR
THOMAS W. F. FOSTER
BY
James E. Toomey
ATTORNEY

3,417,166
MELTING FURNACE METHOD

Thomas W. F. Foster, Walnut Creek, Calif., assignor to Kaiser Aluminum & Chemical Corporation, Oakland, Calif., a corporation of Delaware
Filed Feb. 21, 1966, Ser. No. 536,510
5 Claims. (Cl. 263—52)

This invention relates to a method for melting metal. More particularly, this invention relates to an improved method for recovering metal from finely divided material such as scrap, for example saw chips, swarth, scalpings, foil, etc. The invention has particular application to melting of light metal materials such as aluminum or magnesium.

As used herein the term "aluminum" includes pure aluminum, aluminum of commercial purity containing the usual impurities, aluminum and aluminum alloys, and the term "magnesium" includes pure magnesium, magnesium of a commercial purity containing the usual impurities, and magnesium alloys.

The melting of finely divided light metal material has always presented a problem since finely divided scrap, such as saw chips, swarth, scalping, foil, borings, and turnings all have a high surface area to weight ratio. For example, finely divided aluminum oxides readily when heated in an oxidizing atmosphere. As the oxide coating increases in thickness around a small particle of aluminum, it is increasingly difficult to separate the metal from its oxide.

In the past, many different methods have been used to handle finely divided light metal scrap such as aluminum. One practice was to charge these scalpings into suitable furnaces wherein they were hand puddled to minimize melt loss. Another method of the prior art involved compressing this finely divided scrap into briquettes which were then charged directly into the aluminum remelt furnaces wherein the metal alloys are made up for casting into ingots.

Such prior art practices possess certain inherent disadvantages with regard to melt masses and high labor expense. Hand puddling for melting finely divided aluminum scrap requires a substantial amount of hand labor. Further, careful puddling is required. Negligence results in substantial losses due to oxidizing which causes the formation of large amounts of dross and skim. Since hand puddling requires a liquid metal heel, change from one alloy to another requires complete draining of the furnace to prevent mixing. Because of the cost of draining the furnace between alloys, it is the usual practice to mix alloys which results in a mixed composition, low grade material. Where the finely divided scrap is briquetted and charged directly into remelt furnaces, excessive amounts of skim and dross are formed and must be removed. The metal contained in the skim and dross can only be recovered at substantial expense.

The method shown in U.S. Patent 2,987,391 to Foster and Stephens went a long way towards overcoming these disadvantages of the prior art. However, the method of that patent involved pumping the molten salt bath used to melt the metal from one chamber of the recovery system to another. Due to the material being pumped, i.e., molten salt, maintenance and repair of the pumps creates something of a problem. Thus, the need became apparent for a method of agitating the molten salts and transferring it within the system without the need for mechanical pumping means.

Accordingly, the instant invention is directed to providing a novel method for the melting of metal material which eliminates or substantially reduces the disadvantages of the prior art including the pumping requirement of the Foster and Stephens patent.

Thus, it is an advantage of this invention that metal may be recovered from finely divided metal scrap with a high percentage of recovery and low operational expense. It is a further advantage of this invention that the metal may be recovered from the finely divided scrap material at a low operating expense per pound of metal processed. It is a further advantage of this invention that the finely divided scrap may be processed directly with a minimum of handling before melting. It is still a further advantage of this invention that the recovery of metal may be easily changed from one alloy to another without making mixed composition, low grade material. Other objects and advantages of the invention will become more apparent from the following description and accompanying drawings.

This invention broadly comprises the melting of metal material. The material may be finely divided scrap material such as saw chips, floor scalpings, foil, etc., or it may be in the form of large briquettes, bales or ingots. A body of molten salt material is provided in a first chamber. The salt is selected to have a density less than that of the metal to be melted and is at a temperature sufficient to melt the metal. The molten salt is cascaded out of the first chamber in a gravity flow into a trough so as to create agitation therein. The metal to be melted is introduced into the agitated molten salt in the trough. The agitated molten salt and metal mixture is then cascaded from the trough in a gravity flow into a second chamber so as to achieve intimate contact and mixing of the molten salt and the metal. The mixture of molten salt and metal is then cascaded from the second chamber in a gravity flow into the trough, through the trough and back into the first chamber. The cascading movement of the mixture in a gravity flow between the chambers via the trough is continued until the metal has melted. The metal is then collected below the molten salt in one of the chambers and withdrawn therefrom as desired. The word cascade, as used herein, means a flowing fall of fluid from one level to another creating agitation and turbulence therein.

In order to accomplish melting of metal in practical quantities without excessive circulation of the mixture of molten salt and metal, it is desirable to maintain the temperature of the molten salt an appreciable amount above the melting point of the metal. For example if aluminum metal is being melted, the molten salt should be maintained at a temperature not less than about 1300° F. If magnesium containing metal is being melted, the molten salt also should be maintained at a temperature not less than about 1300° F. The preferred salt composition for aluminum melting employs a eutectic mixture comprising 44% by weight of sodium chloride and 56% by weight of potassium chloride. This eutectic mixture of sodium chloride and potassium chloride has a melting point of about 1225° F. While the preferred salt composition would involve use of the eutectic mixture of sodium chloride and potassium chloride melting at 1225° F. for aluminum melting, satisfactory results may be obtained with other salt mixtures. The salt mixture must also be selected so as to have a density less than that of the metal to be melted. This is important so that the metal may be collected below the layer of molten salt and thus protected from the atmosphere.

While mixtures of sodium chloride and potassium chloride provide the desired temperature range and density for treatment of aluminum, mixtures containing these constituents alone do not affect the protective oxide coatings on the metal. By including a small but effective amount of a fluoride constituent in the molten salt embodying the principles of this invention, a flux is produced which permits stripping the oxide coating from the particles of metal. One fluoride constituent which can be employed for this purpose is cryolite, and it has been found that a very small amount of cryolite, for example 2.5%–5% by weight of total flux is effective. Accordingly, the preferred flux for use with this invention for melting aluminum consists essentially of a mixture of sodium chloride, potassium chloride and a fluoride constituent wherein the sodium chloride and potassium chloride are proportioned with respect to each other in amounts of from 15%–65% by weight of sodium chloride and 85%–35% by weight of potassium chloride and the fluoride constituent is present in a small but effective amount.

While cryolite has been referred to specifically, other fluoride constituents, such as aluminum fluoride and sodium fluoride may be employed. Although a large quantity of the fluoride constituent may be employed, such fluorides are generally expensive and accordingly, the lowest amount of fluoride which will effectively serve the purpose of attacking the oxide coatings is preferred.

A skim of aluminum oxides and molten salt is generally formed in the processing of aluminum metal by this method, which skim has a density less than that of the aluminum and greater than that of the clean molten salt. Accordingly, a layer of such skim is formed when the molten aluminum is collected below the molten salt in one of the chambers. The skim layer is formed between the aluminum on the bottom and the clean molten salt on the top. After a period of time, when the skim has accumulated to a considerable degree, the still clean molten salt in the top layer is withdrawn by a suitable means such as by decanting. Next, all of the molten metal is drained from the bottom of the chamber after which the skim is removed from the chamber by suitable means. Or, alternatively, the molten metal may be drained first and then the salt and skim removed in the manner indicated above.

To begin operation again, all that is necessary is to provide a body of molten salt material in the first chamber as outlined above. This may be done by adding salt that is already molten to the chamber or by adding solid salt to the chamber and melting it in situ.

By the use of the method of this invention all of the metal melting is accomplished below the salt surface, and metal is added in a mixing trough which is separate from the chambers and not exposed to the products of combustion. Therefore, the metal is protected from the products of combustion at all times, and accordingly, very high recovery rates are obtainable. The cascading transfer of the molten salt and also of the molten salt and metal mixture between the chambers via the trough eliminates the necessity for pumps and thus eliminates the pump maintenance and repair requirements. Further, when it is desired to change alloys, it is only necessary to drain the collected pool of metal from the bottom of the chamber, after which the molten salt is cascaded out of the chamber into the trough and metal of the new alloy is introduced into the agitated molten salt in the trough as before. This is a very important feature where numerous alloys must be processed through the same equipment.

The accompanying drawings illustrate presently preferred embodiments of the apparatus of this invention and a presently preferred method of operation.

FIG. 1 is a top plan view with parts removed for purposes of clarity of a presently preferred apparatus embodying the principles of this invention for melting metal.

FIG. 2 is a side elevational view with parts removed for purposes of clarity of the apparatus of FIG. 1.

FIG. 3 is a longitudinal elevational view, partly in section, with parts removed for purposes of clarity of the apparatus of FIG. 1, taken along the line 3—3 of FIG. 2.

FIG. 4 is a top plan view with parts removed for purposes of clarity of another presently preferred apparatus embodying the principles of this invention.

FIG. 5 is an end elevational view in section with parts removed for purposes of clarity of the apparatus of FIG. 4 taken along line 5—5 of FIG. 4 and showing the mounting means for the chambers in this embodiment.

Referring now more particularly to the drawings in which the same reference numerals have been applied to various corresponding parts and with particular reference to the form of apparatus shown in FIGS. 1, 2 and 3 and with particular reference to FIG. 1, one apparatus embodying the principles of this invention includes a first chamber 10 which may, if desired, be provided with suitable heating means as burner 12. A suitable hatch 14 is provided for introducing and removing material therefrom. A metal discharge port 15 with a suitable closing means is provided in the bottom section of the chamber 10 as shown in FIGS. 2 and 3. Chamber 10 may be made of any suitable construction materials, for example, a metal casing and a refractory lining. A roller track 16 is provided for the rotation of the chamber about its horizontal axis. Mixing trough 18 is attached in horizontal alignment to one end of chamber 10. A discharge opening 20 and a fill opening 22 are provided in the wall of chamber 10 adjacent mixing trough 18. To the opposite end of mixing trough 18 from chamber 10 is attached chamber 24 in horizontal alignment with trough 18 and chamber 10. If desired, burner 26 may be mounted for providing heat to chamber 24. Chamber 24 also has a material hatch 28 and a suitable metal discharge port not shown in the bottom thereof. The wall of chamber 24 adjacent trough 18 has a discharge opening 30 and a fill opening 32 provided therein. Chamber 24 is also provided with a roller track 34 for rotation thereof.

FIG. 2 shows a suitable rotating mechanism for the apparatus shown in FIG. 1. This mechanism as shown may consist of, but is not limited to, cable 36 attached to chamber 10 at both ends and wound around horizontal capstan 38 attached to winch 40. As shown, chamber 10 is rotatably mounted on roller 42 and chamber 24 is rotatably mounted on roller 44.

FIG. 3 taken along line 3—3 of FIG. 2 shows the unique shape and arrangement of the side walls of chambers 10 and 24 which facilitates the cascading transfer of material from one chamber to the other. As can be seen in FIG. 3, side wall 46 of chamber 10 is of semi-oblate circular cross-section, as is side wall 48 of chamber 24. The oblate section of each side wall is so arranged with respect to the discharge and fill openings of each chamber that as the apparatus is rotated the material will cascade first from chamber 10 via discharge opening 20 assisted by the semi-oblate circular cross-section of that chamber into trough 18 and thence through fill opening 32 of chamber 24. When the direction of rotation of the apparatus is reversed, material will cascade out of chamber 24 through discharge opening 30 through trough 18 and cascade into chamber 10 via fill opening 22.

Referring now more particularly to FIGS. 4 and 5 wherein another preferred apparatus for the practice of this invention is shown and in which the same reference numerals have been applied to various corresponding parts and with particular reference to FIG. 4, the apparatus comprises a first chamber 50 having a discharge opening and transfer spout 52 and a fill opening and receiving bay 54. A suitable heating means not shown may be provided for chamber 50 such as a gas burner, electric resistance means, etc. Chamber 50 has an exhaust passage 56 connected by a suitable flexible coupling 58 to stack 60 for discharge of products of combustion. Hatch 62 is provided in one wall of chamber 50 and a metal discharge spout 64 is provided in the bottom of chamber 50. Chamber 50 may be made from any appropriate materials of construction, for example a steel casing and a refractory lining.

Positioned adjacent and below discharge opening and transfer spout 52 is mixing trough 66. As shown, mixing trough 66 may be banjo shaped. The mixing trough 66 is in this embodiment mounted for rotation about fill end 68 as an axis. Due to this manner of mounting, the discharge end 70 of trough 66 may be positioned to discharge into the fill opening and receiving bay 54 of chamber 50 or into the fill opening and receiving bay 72 of chamber 74, which is positioned on the opposite side of trough 66 from chamber 50 and is parallel to chamber 50. As shown in FIG. 4, trough 66 may have a labyrinthine or tortuous passage 76 therein to facilitate the agitation of the material as it passes through the trough 66.

Chamber 74 as chamber 50, may be provided with suitable heating means not shown and has an exhaust passage 78 connected through a suitable flexible coupling 80 to stack 82 for discharge of the products of combustion. Chamber 74 is also provided with a hatch 84 and a metal discharge spout 86 located in the bottom of the chamber 74, and with a discharge opening and transfer spout 88 positioned so as to cascade material into the fill end 68 of trough 66.

FIG. 5 taken along line 5—5 of FIG. 4 shows the tilting mechanisms for the chambers. As shown in FIG. 5, chamber 50 is mounted upon hydraulic jacks 90 and 92.

In operation, a body of molten salt material would be provided in chamber 50. This may be done by adding solid salt and melting it in the chamber 50 or by premelting the salt before introducing it into chamber 50. Trough 66 is rotated about fill end 68 so that discharge end 70 is positioned above fill opening and receiving bay 72 of chamber 74. Chamber 50 is tilted upward by jack 92 so that the molten salt material cascades out of discharge opening and transfer spout 52 into trough 66. The metal to be melted is introduced into the agitated molten salt in trough 66. The mixture of molten salt and metal passes through labyrinthine passage 76 and cascades out discharge end 70 of trough 66 into the fill opening and receiving bay 72 of chamber 74. Chamber 74 has been tilted by a hydraulic jack not shown but positioned as is hydraulic jack 90 on chamber 50 so that the material will flow into chamber 74. Chamber 74 is then tilted in the reverse direction by a hydraulic jack not shown corresponding to hydraulic jack 92 of chamber 50 and trough 66 is rotated about fill end 68 to position discharge end 70 of trough 66 over fill opening and receiving bay 54 of chamber 50. The mixture of molten salt and metal cascades out of chamber 74 via discharge opening and transfer spout 88 into mixing trough 66 and passes through mixing trough 66 and out discharge opening 70 into fill opening and receiving bay 54 of chamber 50, chamber 50 having been tilted by hydraulic jack 90 so that it will receive the material. The cascading movement of the mixture from chamber to chamber via the trough is continued until the metal has melted. The molten metal is then collected below the molten salt in one of the chambers and may be removed as desired.

It can be seen that in the practice of this invention, metal may be melted within a molten salt furnace without the need for pumps to circulate the molten material. According to this invention, the salt may be premelted and introduced in molten form to the system. Because no pumps are required the salt can be used for a much longer period of time than has heretofore been possible since this method permits the use of a highly viscous material due to the entrainment of impurities from the metal therein. Similarly, this method will melt metal from dirty painted scrap with a higher degree of efficiency than has heretofore been possible. Since the metal is melted away from products of combustion, i.e., in the mixing trough which is kept separate from the chambers wherein any product of combustion would be and in the chambers wherein the metal is thoroughly coated with salt, a very high recovery rate of metal is possible.

It is to be understood that various changes and modifications may be made in the foregoing method and apparatus without departing from the spirit of the invention and the scope of the appended claims. Although the invention is described in particular in regard to the melting of light metals such as aluminum and magnesium, the invention should not be construed as limited thereto. The method and apparatus of the invention are also applicable to melting metal of other types. Large bales or briquettes of metal can be melted according to the practice of this invention as well as finely divided metal materials.

What is claimed is:

1. A method of melting metal material comprising the steps of:
    (a) providing a body of molten salt material in a first chamber, the salt having a density less than that of the metal to be melted and being at a temperature sufficient to melt the metal;
    (b) cascading the molten salt out of the first chamber into a trough so as to create agitation therein;
    (c) introducing the metal to be melted into the agitated molten salt in the trough;
    (d) cascading the agitated molten salt and metal mixture from the trough into a second chamber so as to achieve intimate contact and mixing of the molten salt and the metal;
    (e) cascading the mixture of molten salt and metal from the second chamber into the trough, through the trough and into the first chamber;
    (f) continuing the cascading movement of the mixture between the chambers via the trough until the metal has melted; and
    (g) collecting the molten metal below the molten salt in one of the chambers.

2. The method of claim 1 wherein the first chamber is rotated about a horizontal axis to bring a discharge opening into position for cascading transfer of the material into the trough and the second chamber is rotated about a horizontal axis to bring a fill opening into position for cascading transfer of the material from the trough into the second chamber and the second chamber is further rotated about a horizontal axis to bring a discharge opening into position for cascading transfer of the material from the second chamber into the trough and the first chamber is further rotated about a horizontal axis to bring a fill opening into position for cascading transfer of the material from the trough into the first chamber.

3. The method of claim 1 wherein the first chamber is tilted for cascading transfer of the material it contains from a discharge opening into the fill end of the trough and the discharge end of the trough is pivoted into position for cascading transfer of the material into the second chamber through a fill opening and the second chamber is tilted for cascading transfer of the material it contains from a discharge opening into the fill end of the trough and the discharge end of the trough is pivoted into position for cascading transfer of the material into the first chamber through a fill opening.

4. The method of claim 3 wherein the trough is pivoted about the fill end as an axis.

5. The method of claim 1 wherein the material flows through a labyrinthine passage in the trough whereby the agitation of the material is increased.

References Cited

UNITED STATES PATENTS

| | | | |
|---|---|---|---|
| 2,987,391 | 6/1961 | Foster et al. | 75—65 X |
| 3,215,419 | 11/1965 | Ankersen | 266—33 X |
| 3,215,421 | 11/1965 | Ankersen | 266—33 |
| 3,206,182 | 9/1965 | Ankersen | 266—33 |

JOHN J. CAMBY, *Primary Examiner.*

U.S. Cl. X.R.

75—65